(12) United States Patent
Conant, II et al.

(10) Patent No.: US 12,450,649 B2
(45) Date of Patent: *Oct. 21, 2025

(54) METHOD AND SYSTEM ENABLING CROWDSOURCED PEER TO PEER PRODUCT RENTAL

(71) Applicant: Transform SR Brands LLC, Hoffman Estates, IL (US)

(72) Inventors: David E. Conant, II, Elgin, IL (US); Sarah Anne Helvie, Grayslake, IL (US); Gregory K. Lacy, Barrington, IL (US); Michael Joseph Polo, Huntley, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 355 days.

This patent is subject to a terminal disclaimer.

(21) Appl. No.: 17/881,149

(22) Filed: Aug. 4, 2022

(65) Prior Publication Data

US 2022/0374972 A1 Nov. 24, 2022

Related U.S. Application Data

(63) Continuation of application No. 15/153,965, filed on May 13, 2016, now Pat. No. 11,443,367.

(51) Int. Cl.
| | |
|---|---|
| *G06Q 30/0601* | (2023.01) |
| *G06F 16/9537* | (2019.01) |
| *G06Q 30/0645* | (2023.01) |
| *G06Q 50/00* | (2012.01) |

(52) U.S. Cl.
CPC ..... *G06Q 30/0645* (2013.01); *G06F 16/9537* (2019.01); *G06Q 30/0625* (2013.01); *G06Q 30/0631* (2013.01); *G06Q 50/01* (2013.01)

(58) Field of Classification Search
CPC ........... G06Q 30/0645; G06Q 30/0625; G06Q 30/0631; G06Q 50/01; G06F 16/9537
See application file for complete search history.

(56) References Cited

U.S. PATENT DOCUMENTS

| | | | | |
|---|---|---|---|---|
| 8,682,804 | B1* | 3/2014 | Yoon ................. | G06Q 30/0645 705/400 |
| 2002/0194112 | A1* | 12/2002 | dePinto ................. | G06Q 30/02 705/37 |

OTHER PUBLICATIONS

A. Ghosh and A. Goel, "Internet Economics [Guest editors' introduction]," in IEEE Internet Computing, vol. 20, No. 1, pp. 8-10, Jan.-Feb. 2016, doi: 10.1109/MIC.2016.10 (Year: 2016).*

* cited by examiner

*Primary Examiner* — Michelle T Kringen
(74) *Attorney, Agent, or Firm* — McAndrews, Held & Malloy, Ltd.

(57) ABSTRACT

A system and method for online peer-to-peer rental of things using crowdsourcing and selected groups of potential lenders. Individuals desiring to borrow a particular thing may search a listing of things offered for rental by lenders that have chosen to list for rental some of the things that they own. If a thing desired by one wishing to rent is not available among the things currently listed for rental, the borrower may request that potential lenders be contacted. Potential lenders may be identified using a collection of personal information for a population of consumers based on consumer purchase history information and consumer rental history information collected by the entity operating the peer-to-peer rental system.

27 Claims, 7 Drawing Sheets

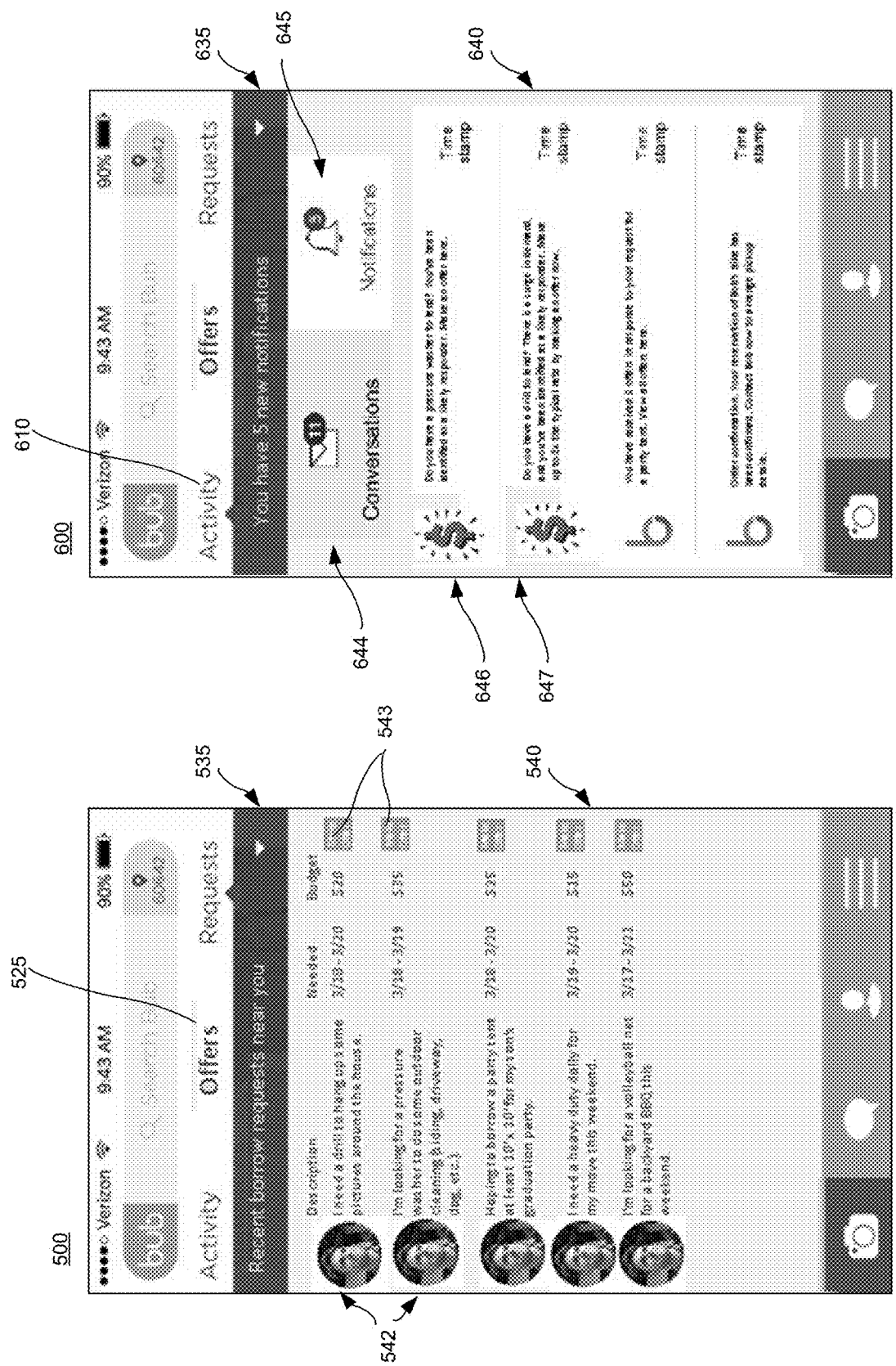

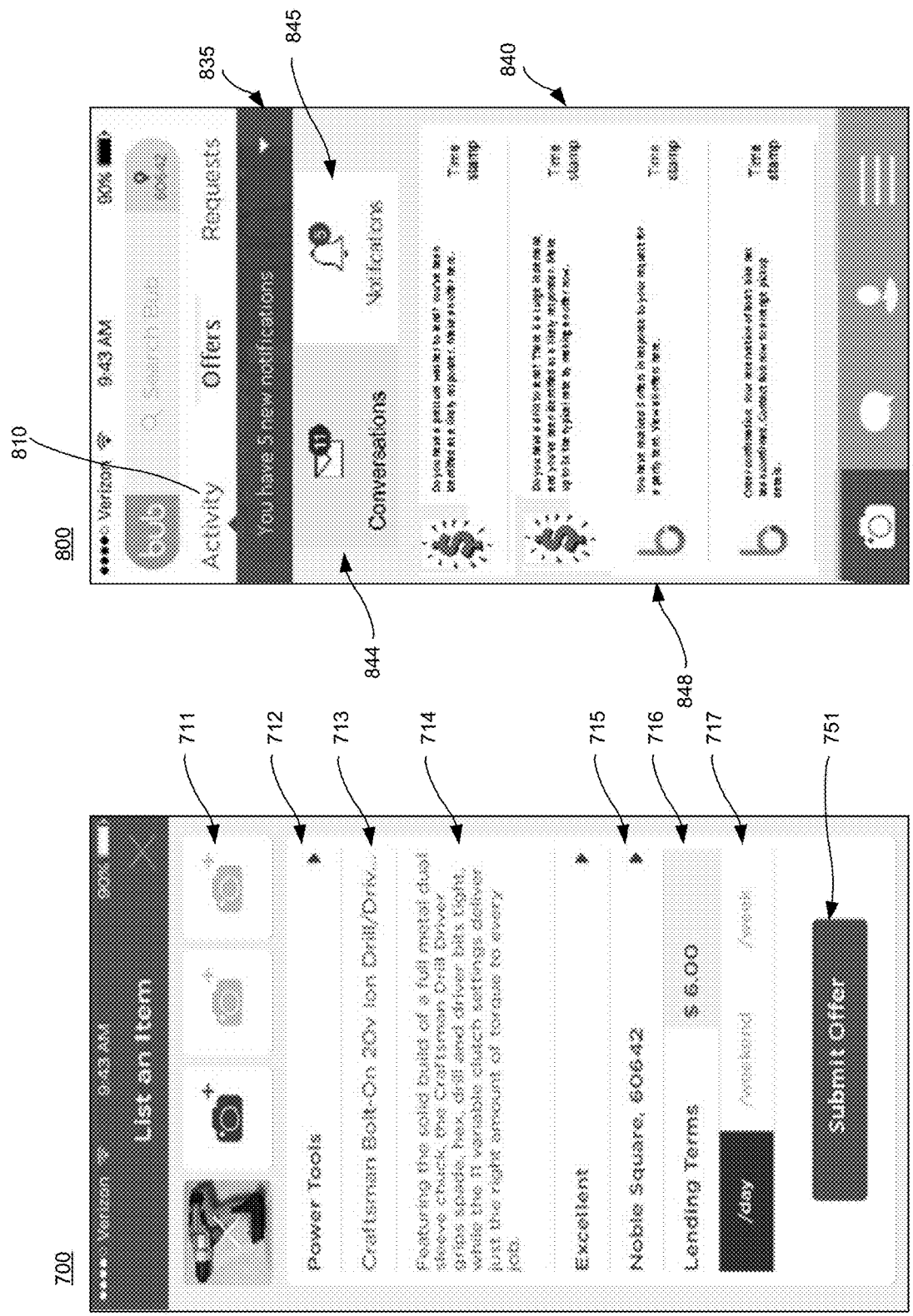

METHOD AND SYSTEM ENABLING CROWDSOURCED PEER TO PEER PRODUCT RENTAL

The present application is a continuation of U.S. application Ser. No. 15/153,965, filed May 13, 2016. The aforementioned documents are hereby incorporated herein by reference in their entirety.

FIELD

Certain aspects of the present disclosure relate to systems and methods that enable the rental of things. More specifically, specific aspects of the present disclosure relate to systems and methods for online peer-to-peer rental of things using crowdsourcing and selected groups of potential lenders.

BACKGROUND

Individuals having a temporary need for a thing which they do not own may poll other individuals to identify someone willing to lend the needed thing. Depending on the nature of the thing, the chance of finding a willing lender of the needed thing within the set of individuals known to the borrower may be quite small, and finding a potential lender in a group of individuals that do not know the borrower is even smaller. The individual needing the thing may contact one or more companies that rent various items, to identify a company that rents the needed thing. If the thing cannot be found for rent from a commercial rental company, the individual needing the thing may be forced to buy the thing, although they may have little or no future need for it.

Limitations and disadvantages of conventional methods and systems will become apparent to one of skill in the art, through comparison of such approaches with some aspects of the present methods and systems set forth in the remainder of this disclosure with reference to the drawings.

SUMMARY

A system and method for online peer-to-peer rental of things using crowdsourcing and selected groups of potential lenders, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 5 is an example mobile device screen used to display rental requests from other users in the vicinity of the user of the mobile device, in accordance with various aspects of the present disclosure.

FIG. 6 is an example mobile device screen used to display notifications and other communication to the user that is related to peer-to-peer rental activity, in accordance with various aspects of the present disclosure.

FIG. 7 is an example mobile device screen that may be displayed by a mobile application on a user device to enable a user to respond to a rental request by listing an item for rental, in accordance with various aspects of the present disclosure.

FIG. 8 is an example mobile device screen used to display notifications and other communication to the user that is related to peer-to-peer rental activity, in accordance with various aspects of the present disclosure.

DETAILED DESCRIPTION

Figure 1:
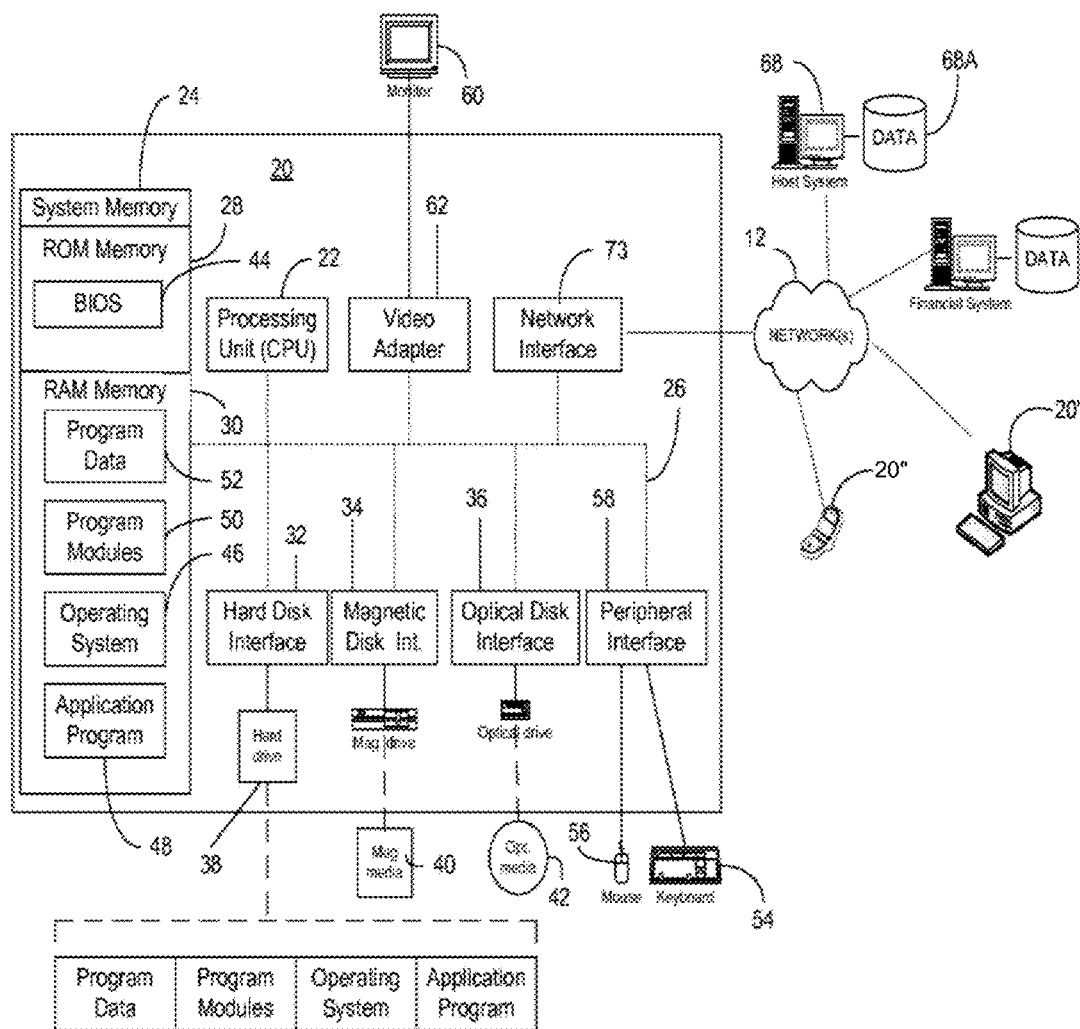
FIG. 1 is an illustration of exemplary computer network in accordance with various aspects of the present disclosure.

Aspects of the present disclosure relate to systems and methods that enable the rental of things. More specifically, certain aspects of the present invention relate to systems and methods for online peer-to-peer rental of things using crowdsourcing and selected groups of potential lenders.

The following description of example methods and apparatus is not intended to limit the scope of the description to the precise form or forms detailed herein. Instead the following description is intended to be illustrative so that others may follow its teachings.

The present application relates to the rental of products. More specifically, the present application relates to a method and system that enables the crowdsourced rental of things.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "exemplary" or "example" means serving as a non-limiting example, instance, or illustration. As utilized herein, the term "e.g." introduces a list of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc. The terms "customer," "consumer," and "user" may be used herein interchangeably to refer to a potential or existing purchaser or borrower/renter of product items or things.

The term "social network" may be used herein to refer to a network of family, friends, colleagues, and other personal contacts, or to an online community of such individuals who use a website or other technologies to communicate with each other, share information, resources, etc.

The term "borrow" may be used herein to refer to the authorized use of a product item or thing belonging to one individual or group, by another individual or group. The term "rent" may be used herein to refer to the borrowing of an item or thing, according to agreed upon terms and/or conditions (e.g., date, time, duration) for a specified fee. The term "borrower" may be used herein to refer to an individual or group that borrows an item or thing, and the term "lender" may be used herein to refer to an individual or group that provides a thing or item to a borrower.

The disclosed methods and systems may be part of an overall shopping experience system created to enhance the consumer shopping event. In one example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

FIG. 1 is an illustration of exemplary computer network, in accordance with various aspects of the present disclosure.

The following discloses various example systems and methods for, by way of example and not limitation, producing and delivering direction information to customers via a computer network, to a handheld or mobile device such as those described above, and to devices such as kiosks and public terminals located both indoors and outdoors at business and other locations. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("FDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents, social network storage of a shopping list, receiving a location of a customer via a mobile device, maintaining maps and layouts of buildings and geographic areas, calculating directions or routes within buildings and geographic areas, receiving a request for a service call center connection from either a customer or a sales associate, routing the request via a distributed mobile video call center, supporting online peer-to-peer rental of things using crowdsourcing and selected groups of potential lenders, and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A system in accordance with various aspects of the present disclosure may serve a population of users such as, by way of example and not limitation, customers of a merchant having an online and/or one or more "brick-and-mortar" or "physical" business locations, and may, for example, provide a user with recommendations on what things they might want to rent next, based on, for example, personal information of the user and data collected by a such a system from the population of users. Such customers may be member of a loyalty program of the merchant and/or business partners, for which the merchant may have detailed personal and transaction information. Having such information available enables this aspect to provide users with suggestions about what things they might want to rent such as, for example, tools, furniture, appliances, clothing, electronics, or any other item that one user may need to borrow, or have to lend to others, to either save money by not buying the thing, or engage in an activity they have not engaged in previously.

Such suggestions may be generated by the system using data from a variety of sources, including the customer's own purchase and rental history information, and that of other customers, to determine the items to recommend to a given user. For example, the purchase or rental history of a given customer may include one or more things usually employed in a particular type of do-it-yourself (DIY) project or have a particular intended use. Based on such information, a system in accordance with various aspects of the present disclosure may identify other items that are related to, or have a high likelihood of being used for the completion of such a DIY project or activity. Such recommendations may be produced and presented to the users by the system, autonomously, as opportunities for arise, in that many consumers in need of an item system in accordance with the present disclosure may increase the frequency of rental of things, thereby also increasing the willingness of users to rent those things that they have.

As mentioned above, a system in accordance with various aspects of the present disclosure may generate recommendations for items for the user to rent based on, for example, their own purchase or rental history. Users that have no prior transactions on a system according to the present disclosure may be presented only with suggestions for popular rental items. However, users who rent particular items may be presented with recommendation of related items that other users, for example, those with similar personal information (e.g., similar demographics, purchase history, life stage, age, marital status, etc.) have also rented. Based on the amount of information the merchant has for a given user, a system in accordance with the present disclosure may use deliver recommendations of things to rent, according to product category propensities, and may make delivery recommendations, where applicable.

Although a system in accordance with various aspects of the present disclosure enables users to rent items or things from other users, and to rent items or things to other users, the users of such a system may not know what fee to request when lending the item for rental. A system according to various aspects of the present disclosure may provide reasoned estimates or recommendations of the rental fee that a user should request when deciding to place their own things up for rent, and may also provide a "one-click" way for a user to request an estimate of the resale/trade-in value of their listed rental item(s) as an aid in making the decision to rent or sell an item or thing.

A system in accordance with various aspects of the present disclosure may access information from a variety of sources in calculating recommended rental fees and resale values, including the personal information of the users of the system. The system may, for example, provide such resale value information, and may provide a platform via which a user may resell their items or things. Information about user resale transactions or offerings may be collected by the system, and may be provided to other users to provide a simple reference to users as they price their items for resale. In this way, a system according to various aspects of the present invention may provide support for user rental or resale of their items, whichever the user chooses. The algorithm used to generate rental fees and resale price estimates or recommendations may, for example, factor in original/current item purchase price, original date of purchase, number or frequency of rentals of the same or similar items, review ratings of borrowers of the same or similar items, and expected depreciation of the type of item, and may learn and adjust to better predict the fee/price at which a given item will rent/sell best, based on rental/resale activity of related items.

A system in accordance with various aspects of the present disclosure may allow users to pre-populate their inventory of items that they make available for rental/resale, by accessing the purchase history data of the user from the personal information of the user. This gives users a way in which the user may, with a single click, list items to rent or resell to others, saving the user time and helping the user to remember what items or things that they have that may qualify as rental/resale items. In listing the items from prior purchases of the user, a system in accordance with the present disclosure may filter the items or things, so that only those purchases that might be rented or resold are shown. For example, while thing like tools, furniture, and electronics are likely items in which others may be interested as rental items, a bag of charcoal, repair parts for a lawn mower, or items of clothing are less likely to evoke interest.

In order to aid in developing the supply-side of "peer-to-peer" rentals, a system according to various aspects of the present disclosure continuously reach out to potential renter/lenders, and to make the process of listing items for resale and/or rental as easy as possible. For example, in a system according to aspects discussed herein, a customer/user may sign up as a new user of the peer-to-peer rental system described herein. The new user may then be asked if they would like to list items that they may have available for rent by, for example, providing credentials that identify them as a customer of the merchant or member a loyalty program of the merchant. The prior purchase transactions of the user with the merchant may then be retrieved and a listing of "rentable" items may be displayed to the new user of the peer-to-peer rental system. The new user may then click-on or mark those items that they wish to list for rental, and submit the list of marked items. The marked items may then be added to the list of items that the user has made available to other user for rental.

A system in accordance with various aspects of the present disclosure provides users (e.g., borrowers and lenders) a platform/marketplace via which to rent almost any item or thing to and from each other, allowing lenders/renters to set their own prices and terms. Such a system gives lenders an outlet through which to make money on items that would otherwise sit dormant in their home or storage. A system in accordance with aspects of the present disclosure also gives borrowers the opportunity to save money by borrowing, rather than buying the item(s) the product items they need, providing the borrowers with access to activities in which they would not otherwise have participated without access to the item(s) they borrow. In accordance with various aspects of the present disclosure, such a system connects lenders and borrowers for rental of listed items, and in addition, provides a mechanism for users to submit requests for items that are not listed by the system.

A potential barrier to the adoption by a user of an online peer-to-peer rental system web site or mobile app is the possibility of searching for a particular item and finding no matching items. A system in accordance with various aspects of the present invention provides a mechanism for a user in such a situation to proactively reach out to individuals known to the borrower (e.g., neighbors) and other individuals not known to the borrower, to check whether any other system users that have a product item matching the product item of interest that has not been submitted for rental, and prompting them to list such product items, to helps address this issue. Such proactive contact with other users, an action may be referred to herein as a "shout-out," and together with providing to a user an immediate listing of matching products has a positive impact on the perception of the system by users.

In accordance with various aspects of the present disclosure, a user of a system may submit an online request to borrow/rent a particular product item. The system may then find matching items submitted for rental by other system users located within a specific geographic radius of the user wishing to borrow the product item. The owners of items matching the requested item may then be notified of the rental request using a communication means of their choice (e.g., email, mobile text message, online social media posting, in-app posting). If too few or no matching product items are found by the system, the borrowing/renting user may request that other individuals that have not listed the desired product item for rental be contacted, to identify potential lenders/renters of the desired product item.

A system in accordance with various aspects of the present disclosure may provide a user interface that enables a first user willing to lend/rent product items that they own, to submit those items for inclusion in a collection of product items available for rental by others. One example of a suitable user interface in the form of a mobile device screen is shown and described below with respect to FIG. 7. An additional mechanism previously discussed above permits a user to automatically submit for rental, suitable product items taken from the user's purchase history from a merchant or partner businesses that may be operators of the peer-to-peer rental platform discussed herein.

Figure 2A:
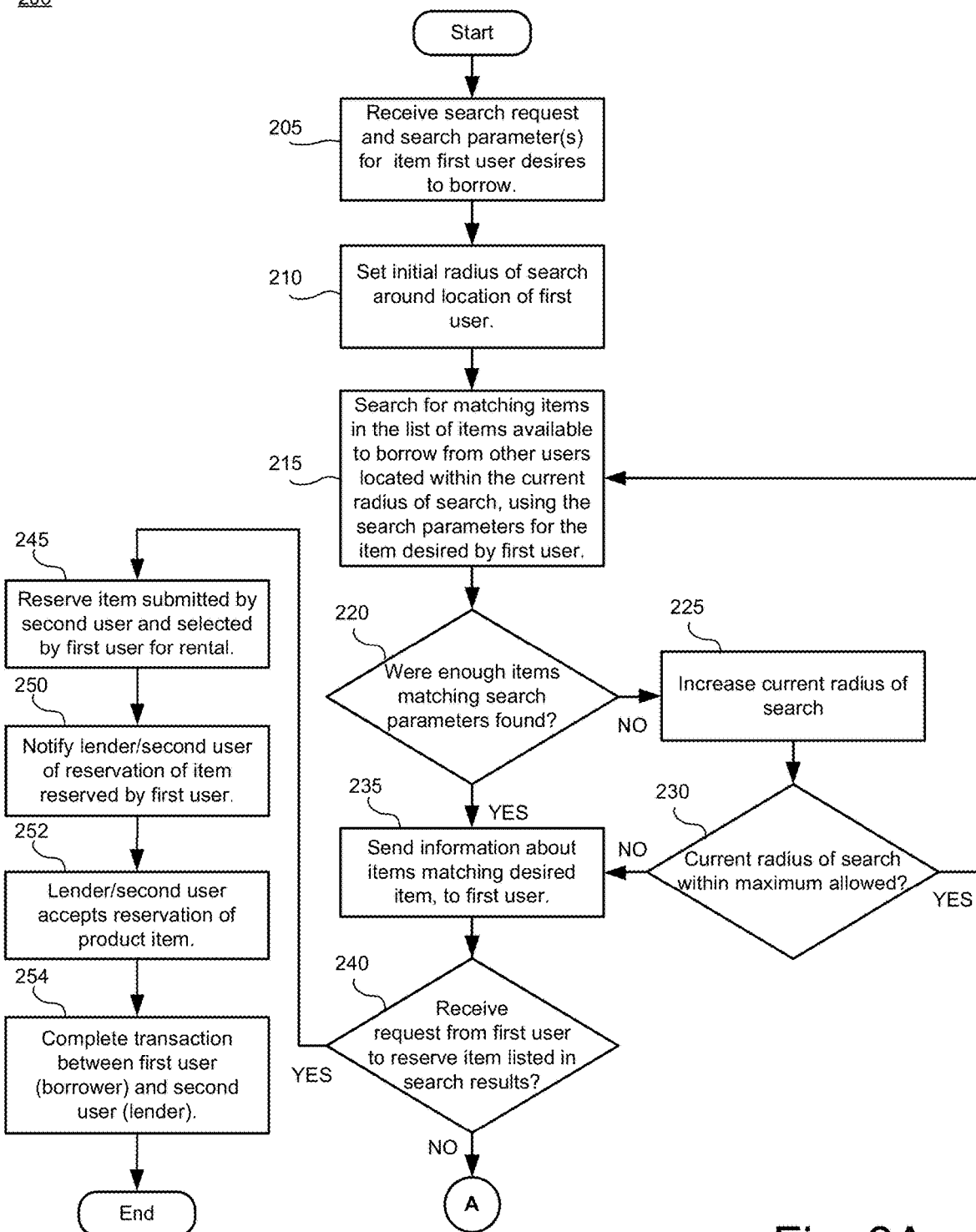
FIGS. 2A-2B are a flowchart illustrating the actions of an example process that may be performed by a system that supports peer-to-peer crowdsourced rental of product items among a population of users, in accordance with various aspects of the present disclosure.
Figure 2B:
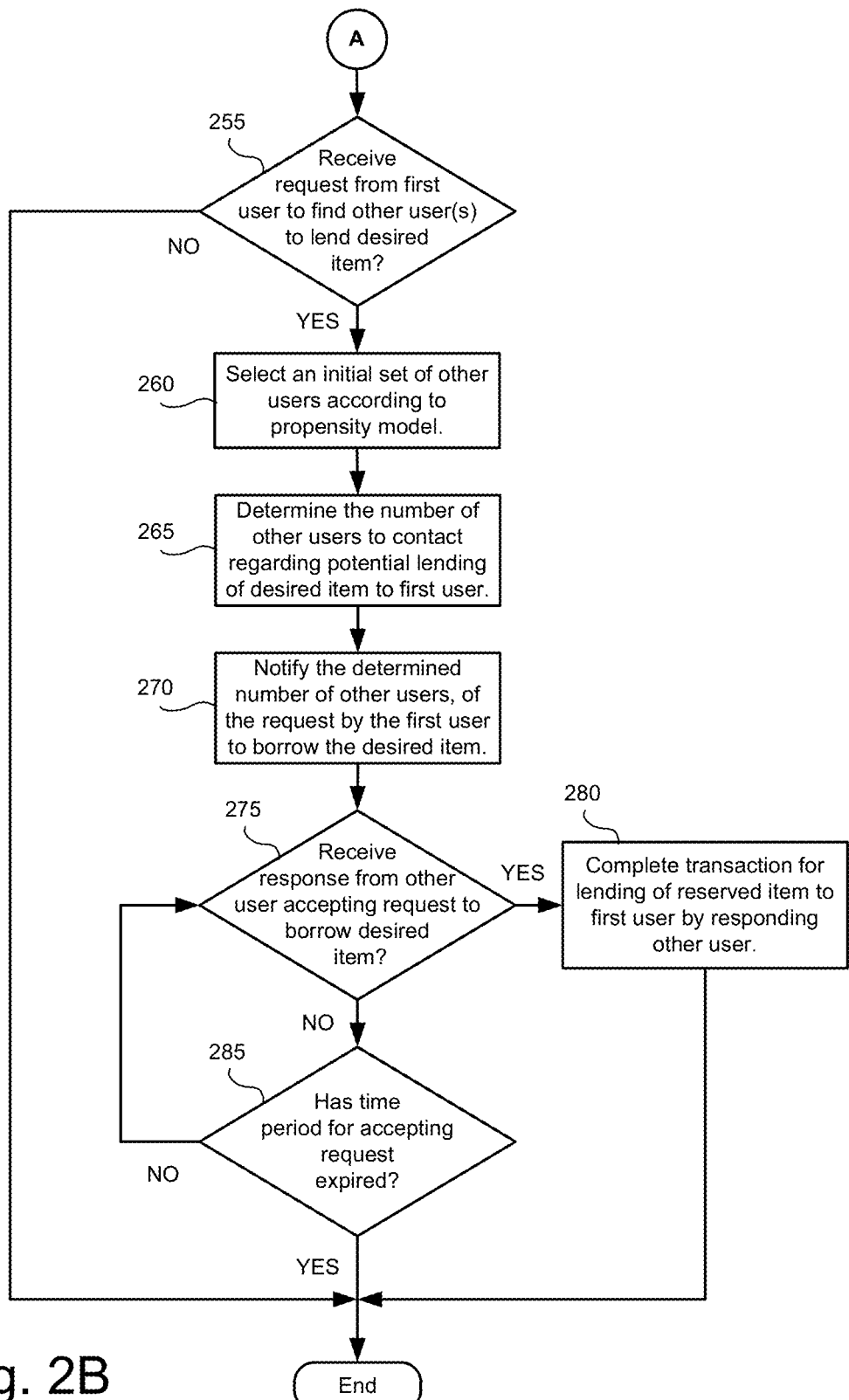

FIGS. 2A-2B are a flowchart illustrating the actions of an example process 200 that may be performed by a system that supports peer-to-peer crowdsourced rental of product items among a population of users, in accordance with various aspects of the present disclosure. The actions shown in FIG. 2 may be performed by a system such as that shown in FIG. 1 that has been configured to have memory arranged to store data structures linking product items, and respective owners, rental terms, owner geographic location, owner contact information, and other parameters used in making such a system function as described herein. The actions of the example process illustrated in FIG. 2 begin at block 205, following the establishment of the above data structures for a collection of product items submitted by various users of the system for rental to other users of the system.

At block 205, a system according to the present disclosure may receive a search request and search parameter(s) characterizing a product item from a first user that wishes to rent/borrow the product item. As discussed herein, such a request may be received via a web page displayed by a web browser running on a personal computer or mobile device, or via a dedicated mobile application running on a mobile device of the first user. In accordance with various aspects of the present disclosure, the rental request of the first user may be available for viewing by all users of the system with a certain distance of the geographic location of the first user. In addition, certain users of the system may specifically be sent a notification of the rental request, depending upon a "Rental Propensity Score" generated by a "Rental Propensity Model," discussed below.

At a next block 210, the system may initialize or set a current radius of search around the geographic location of the first user to an initial geographic distance, representative of a current boundary within which the lenders/renters of the product item of interest to the first user must be located in order to be included in the search results. This radius of search may be initialized at any suitable value, and may preferably be set to a value representing a travel distance acceptable to the majority of renters/borrows that travel to pick up and return the borrow/rented item.

Next, at block 215, the system may perform a search of the collection of product items submitted by other users for rental, to identify product items that match or are sufficiently similar to the search parameters for the product item desired by the first user and that are product items available to borrow from other users located within the current radius of search. An example user interface suitable for searching such a collection of product items is shown in the form of a mobile device screen and described below with respect to FIG. 4. In accordance with various aspects of the present disclosure, the search may result in identifying no product items matching the product item desired by the first user, one matching product item, or multiple matching product items.

At block 220, the method of FIGS. 2A-2B determines whether a sufficient number of product items were found that match the product item that the first user wants to rent/borrow. In accordance with various aspects of the present disclosure, a system performing the method of FIGS. 2A-2B may attempt to identify a certain minimum number of matching product items for rent such as, for example, 10, or 100, or 1000, from which the first user may choose product items for which the first user will submit a rental request. If, at block 220, it is determined that the search has identified at least the minimum number of matching product items, the method continues at block 235 discussed below. If, however, it is determined at block 220 that fewer than the minimum number of product items have been found by the search, the system may, at block 225, adjust (e.g., increase) the current radius of search to a larger value, and may then, at block 230, determine whether the current radius of search is within an allowed maximum radius of search. If it is determined, at block 230, that the current radius of search is within the maximum allowed radius of search, the method of FIGS. 2A-2B loops back to block 215, where the system then performs another search for matching product items. If, however, it is determined that the current radius of search is not within the maximum allowed radius of search, the method continues at block 235.

At block 235, the system performing the method of FIGS. 2A-2B sends a list of information about the product items matching the product item requested for rental by the first user to, for example, the browser on the personal computer, or the mobile application on the mobile device of the first user, for review by the first user. The list sent to the first user may contain a subset of a certain number of the product items found during the search such as, for example, 25 product items, although other numbers of matching product items may be displayed in the list. Next, at block 240, the method directs a system according to aspects of the present disclosure to determine whether the system has received a request from the first user to reserve a product item on the list of products items matching the product item requested by the first user. If, at block 240, it is determined that the first user did not request to reserve one of the matching product items identified by the search, the method of FIGS. 2A-2B continues at block 255 of FIG. 2B, discussed below. If, however, it is determined, at block 240, that the first user has selected one of the product items identified by the search, the method then, at block 245, directs the system to reserve the product item(s) selected by the first user, and at block 250, notifies the user/lender of the request by the first user to reserve the selected product item. Then, at block 252, the second user/lender of the reserved product item accepts the reservation, and at block 254, the first and second users complete the rental transaction, and the method of FIGS. 2A-2B is ends.

If the method determines, at block 240, that the first user failed to reserve any of the product items identified by the search, then at block 255 of FIG. 2B, the system performing the method determines whether a request has been received from the first user to "shout-out" to other users that may own, but may not have submitted the product item of interest to the first user, for rental. Such individuals may still be potential renters/lenders of the product item desired by the first user. If the first user has not requested use of a "shout-out" to potential lenders of the product item desired by the first user, the method of FIGS. 2A-2B ends. If, however, the first user does wish to employ a "shout-out," the method of FIG. 2B continues at block 260, where the system performing the method selects an initial set of other users that are determined to be potential lenders of the product item desired by the first user, based on a probability or likelihood of ownership of the product item desired by the first user. Next, at block 265, the method directs the system to determine a number or quantity of the potential lenders to be contacted by the system in regard to the availability for rental of the product item desired by the first user. The system then, at block 270, sends a notification to the determined number of potential lenders, informing them of the request of the first user to rent the product item of interest.

Next, at block 275, the system determines whether a response has been received from any of the potential lenders, accepting the request of the first user to rent the product item of interest. If the system determines that one of the potential lenders has acceptance the rental request of the first user, the system then, at block 280, completes the remaining detail of the transaction for lending the requested product item by the accepting potential lender to the first user, and the method of FIGS. 2A-2B then ends. If, however, the system determines that none of the potential lenders have accepted the request of the first user, the method of FIGS. 2A-2B then, at block 285, determines whether a defined time period for accepting the request has expired. If the defined time period for accepting the rental request has expired, the method is finished. If, however, it is determined that the defined time period for accepting the rental request of the first user is not expired, the method of FIGS. 2A-2B then loops back to block 275, to again check for receipt of any acceptances by the potential lenders notified of the rental request of the first user.

In accordance with various aspects of the present disclosure, a likelihood of ownership and, therefore, potential rental of various product items that a user might have may be determined based on, for example, a purchase history of the user as maintained by a merchant or a business partner of a merchant or operator of a system such as the example various aspects of which are described herein. For example, a software model that may be referred to herein as a "Rental Propensity Model" may be employed to calculating a "Rental Propensity Score," which may represent a likelihood of a given user or potential renter becoming a renter of a particular product item based on a number of factors including, by way of example and not limitation, their purchase history, and their rental history. For example, the purchase history of a potential lender may show that a potential renter previously purchased the product item of interest to a renter/borrower, even though the potential lender has not submitted that product item to the system as being available for rent. In addition, a potential lender may have purchased or rented other product items or project supplies that are related in use or purpose to the product item of interest to a renter/borrower, increasing the likelihood that the potential renter will, in fact, own the product item of interest to the renter/borrower, and agree to rent the product item of interest, if solicited to do so. In accordance with various aspects of the present disclosure, the group of potential renters may be identified as those with the highest "Rental Propensity Scores."

Additional factor that may be used in computing a "Rental Propensity Score" in accordance with aspects of the present disclosure include, by way of example but not limitation, the number and identifiers of product categories purchased from a merchant or its business partners, date of the most recent purchase from the merchant, whether the potential renter has a practice of redeeming loyalty reward points, the total dollar volume of product items purchased from the merchant by the potential lender, and demographic factors such as age, gender, occupation, household income, homeowner/renter status, among numerous others. Further factors that may be incorporated in the calculation of the Rental Propensity Score may include, for example, the number of peer-to-peer rental transactions as a lender, the average rating given to the potential lender as a lender, the number of previous responses to rental requests, the number of previous rental request transactions, and a number of other measure derived from the behavior of the potential lender related to peer-to-peer rental.

In accordance with various aspects of the present disclosure, the factors used in the generation of the "Rental Propensity Score" may be adjusted, as well as weight assign to each factor, by identifying past successfully potential lenders that are found to be reliable request responders. The factors discussed above may be weighted and combined in the calculation of the "Rental Propensity Score," and a rental propensity ranking may be assigned to each user, which may be specific to each product category. This information may be used to identify those users of the system with the highest "Rental Propensity Scores" for each product category. For example, if for the product category of "Handheld Power Tools", a factor of "number of transactions as a lender" is the most predictive factor, then that factor will be given the greatest weight when determining each user's "Rental Propensity Score" for this product category. Every user, based on their composite score is then ranked (#1, #2, #3, etc.)

A system in accordance with various aspects of the present disclosure may determine if a given day is to be considered to have status as a "Surge Day" or as a "Non-Surge Day," and may use the status of each day in calculations described below.

A system in accordance with various aspects of the present invention may determine, for a "Non-Surge Day"," how many potential lenders to contact to evoke at least a certain minimum number of responses to a notification of a rental request, which may be referred to here as a "targeting depth." Such a system may first determine the "Rental Propensity Scores" for the users, and next determine how many of the potential lenders are to be sent a notification of a rental request. This approach may us past request response data to determine a range (i.e., "Min" to "Max") by calculating how deep into the "Rental Propensity Model" an average request in a given category needs to go in order to capture, e.g., one response (i.e., the "Min Depth") vs. how deep into the "Rental Propensity Model" requests in the given category need to go in order to capture, e.g., three requests (i.e., the "Max Depth"). The average equals the number of people at the top of the model that receive the notification. For example, if in past rental requests, the highest ranked user to respond to the request was ranked number 20 in a particular product category's "Rental Propensity Model," then the "Min Depth" is assigned the value 20. If the system must contact the user ranked number 40 to capture a third rental request response, then the "Max Depth" is assigned the value of 40. In accordance with aspects of the present disclosure, the average of the "Min Depth" and "Max Depth" is used, which in this example, is the value of 30, which means the system will send a notification of the rental request to the to 30 users in the ranking generated for the particular product category.

A system in accordance with various aspects of the present disclosure may use the same process for determining how many users to send a notification of a rental request as that used for a "Non-Surge Day," except that the notification may be sent to more users. More specifically, the number of users to which the notification is sent for a "Surge Day" is the number of users calculated for a "Non-Surge Day" multiplied by a factor equal to the average of how much higher merchant sales, reservations, and requests are on the "Surge Day" are above the average merchant sales, reservations, and requests for a "Non-Surge Day." For example, in the case of a "Surge Day," if merchant sales for a particular category were two times that of a normal (i.e., "Non-Surge") day and rental reservations and rental requests for the particular category were three times that of a "Non-Surge" day, then the multiplication factor is 2.5 times (i.e., the average of 2× and 3×). In this case, the example 30 users mentioned above to be sent notifications on a "Non-Surge Day" becomes 75 people (30×2.5) on a "Surge Day."

In accordance with various aspects of the present disclosure, notifications of rental requests on a "Non-Surge Day" may be sent using a user's pre-specified channel preference (e.g., text message, email, social network post, in-app notification, etc.), Those not currently signed up to participate as a user of the peer-to-peer rental system of the present disclosure but still identified in the system may receive an email invitation to sign up for participation in the peer-topeer rental system with the prospect of making money with product items which they own (or are likely own) specifically identified (e.g., "highlighted").

In accordance with various aspects of the present disclosure, notifications of rental requests on a "Surge Day" may be sent using the same process as that used for a "Non-Surge Day", but may be sent to the identified surge users and with a change in pricing or messaging. On a "Surge Day," users may be encouraged to list their product items (in a given category) with a price equal to the average rental rate for that product item and category, but multiplied by the average of how much higher merchant sales and rental reservations and rental requests are above average.

In accordance with various aspects of the present disclosure, any user who receives a rental request can respond with an offer. By creating an offer, the user may create an item listing containing all of the same information as any other listing (e.g., image, product description, product condition, pricing). That is, the same categories of information requested of a user listing a product item for rental may be required of a potential lender responding to a rental request notification. All of the offers created in response to a rental request notification appear in a listing for review by the user submitting the "shout-out" rental request. The user submitting the "shout-out" rental request is notified as each offer comes in, and all such offers show up in the mobile application or online web page in real time. Users may respond to "shout-out" rental requests at any time within a certain period of time after the initiation of the "shout-out" rental request such as, for example, a period of seven days, or until the user that submitted the "shout-out" rental request closes/cancels the "shout-out" rental request.

In accordance with various aspects of the present disclosure, a reserved product item rental transaction is initiated the instant the lender clicks-on/selects the "Accept" option in response to a borrower's request to reserve the product item. When multiple lenders respond to a product item rental reservation, the rental transaction is initiated the instant the first lender responds by clicking-on/selecting the "Accept" option. In the case of a rental request, the rental transaction is initiated when the user that submitted the rental request clicks-on/selects "Accept" to a selected lender's offer.

In accordance with various aspects of the present disclosure, lenders who respond to a submitted rental request and lenders who become part of the selected offer may be notified that they have just earned points in a loyalty program of a merchant.

The following discussion describes example user-interface screens that may be displayed on such devices as, by way of illustration and not limitation, a mobile device of a user by a mobile application running on the user device. Although FIGS. 3 through 9 illustrate example user interface screens rendered by a mobile application on a mobile device such as, for example, a smart phone, tablet computer, or other mobile device, it should be noted that a graphical interface providing the functionality of FIG. 3 through FIG. 9 may also be provided by an application program running on a desktop, laptop, or notebook personal computer, or a server-side program running on a server of web site in which the server generates web pages for display by and receives user input via an Internet browser such as, for example, the Internet Explorer© software application from Microsoft Corporation, the Safari© software application by Apple, Inc., and the Google Chrome© software application from Google Inc.

Figure 3:
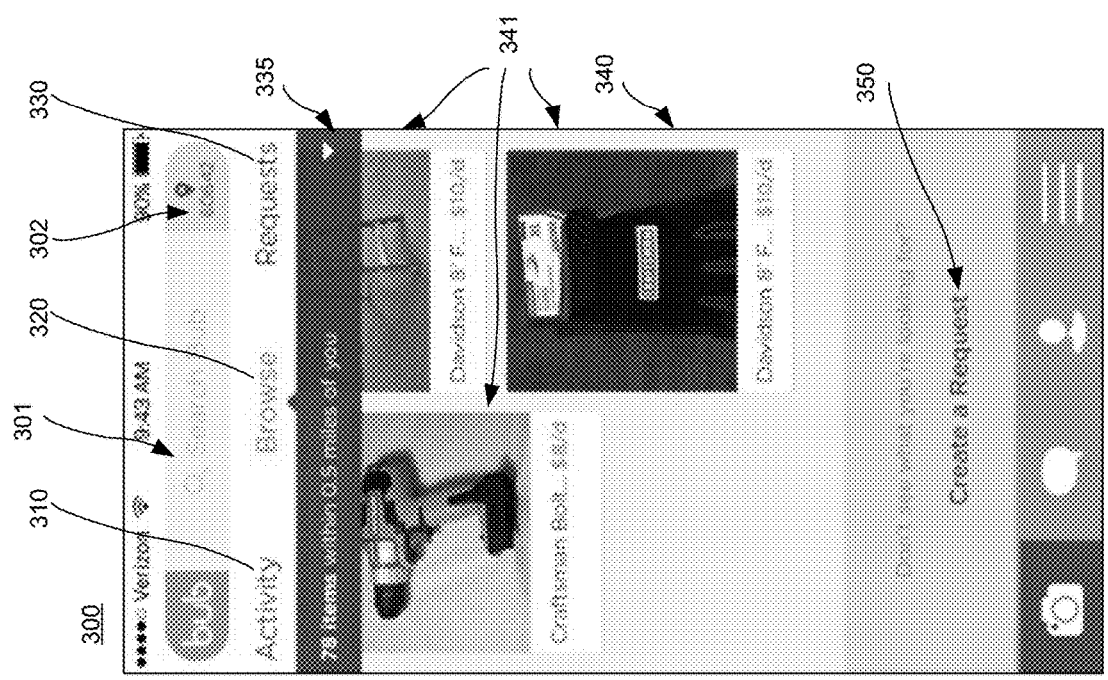
FIG. 3 is an example mobile device screen that may be displayed on a user device by a mobile application ("app"), in accordance with various aspects of the present disclosure.

FIG. 3 is an example mobile device screen 300 that may be displayed on a user device by a mobile application ("app"), in accordance with various aspects of the present disclosure. The mobile device screen 300 of FIG. 3 includes a number of user interface elements such as, for example, an "Activity" tab 310, a "Browse" tab 320, and a "Requests" tab 330. In addition, the mobile device screen 300 includes a message area 335, and a content portion 340. In the example of FIG. 3, the user has selected the "Browse" tab 320, which enables a user to browse a listing of items 341 that have been offered for rental by other users, which is shown in the content portion 340. The user may enter terms describing the thing or item that they are seeking to rent in the "Search Terms" box 301, and may center the search for renters of the desired device about a Zip code provided by the user in "Zip code" box 302.

If a user fails to find the desired item in the results of the search performed with the user specified "Search Terms" box 301 and "Zip code" box 302, shown in the content portion 340, the user then has the option to create a request to rent the desired item by selecting the "Create a Request" button 350. Creating a custom request allows the user to determine what similar items other users have, but may not have listed for rental, in a system according to the present disclosure.

Figure 4:
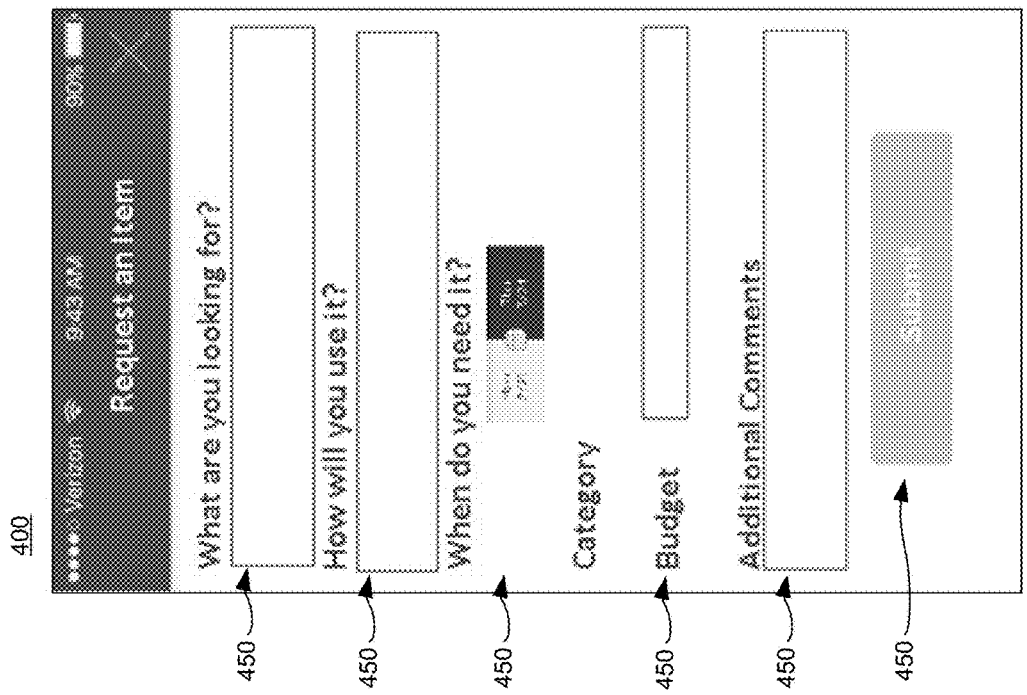
FIG. 4 is an example mobile device screen to enable the user to request an item that they wish to rent, which may be displayed by a mobile application on a user device upon selection of the "Create a Request" button of FIG. 3, in accordance with various aspects of the present disclosure.

FIG. 4 is an example mobile device screen 400 to enable the user to request an item that they wish to rent, which may be displayed by a mobile application on a user device upon selection of the "Create a Request" button of FIG. 3, in accordance with various aspects of the present disclosure. Upon the user clicking the "Create a Request" button 350 of FIG. 3, the user is then prompted to provide a few details of the desired item, in order to submit their request. As shown in the example illustrated in FIG. 4, the mobile device screen 400 provides a "What are you looking for?" text box 460 in which the user may enter a textual description of the desired item or thing, and a "How will you use it?" text box 461, in which the user may describe the intended use to which the user will put the item they wish to rent. The user may enter a date range in the "When do you need it?" user interface element 462, and text identifying a category or product to which the desired item belongs, in the "Category" text box 463. The user may indicate the amount that they're willing to pay to rent the desired item, in the "Budget" text box 464, and provide any additional information in the "Additional Comments" text box 465. A "Submit" command button 466 is also provided. Once the user fills in the information for the various fields described above and clicks-on the "Submit" command button 466, a user request for the desired item is posted, and notifications are sent to likely responders, as identified by what may be referred to herein as a "Request Propensity Score" generated according to a "Request Propensity Model," described in further detail herein.

FIG. 5 is an example mobile device screen 500 used to display rental requests from other users in the vicinity of the user of the mobile device, in accordance with various aspects of the present disclosure. The mobile device screen 500 may be displayed by the mobile application upon user selection of the Requests tab 330 of FIG. 3, for example. In accordance with various aspects of the present disclosure, any user of the mobile application may, at any time, see the list of current item rental requests that have been created by other users in the vicinity of the user of the mobile application, but specific ones of the other users of the system may be targeted with additional notifications, depending upon, for example, the likelihood that those other users will respond to the rental requests. As shown in the illustration of FIG. 5, the mobile device screen 500 also includes an "Offers" tab 525, and a number of "borrow requests" 542 displayed in the content portion 540 of the mobile device screen 500, where each "borrow request" 542 has a "Make Offer" button 543, to permit the user viewing a "borrow request" 542 to create an offer to rent an item they own to the user from whom the "borrow request" 542 originated, as described below.

FIG. 6 is an example mobile device screen 600 used to display notifications and other communication to the user that is related to peer-to-peer rental activity, in accordance with various aspects of the present disclosure. The mobile screen 600 may be displayed by a mobile application on a user device upon selection of an "Activity" tab, such as the "Activity" tabs 310, 610 of FIGS. 3 and 6, for example. As shown in the example of FIG. 6, the mobile device screen 600 includes an indication in the message area 635 of the number of new notifications received by the user of the mobile application, and indicators 644, 645 showing the number of conversations and notifications involving the user. The content portion 640 of the mobile device screen 600 shows the messages of the inter-user communication and the notifications received by the user of the mobile application. In accordance with various aspects of the present disclosure, users with the highest "Request Propensity Score" for a particular category may receive additional notifications about relevant recent requests, such as the notification 646 of FIG. 6. In addition, users with the highest "Request Propensity Score" for a particular category may receive an additional notification about a relevant recent request in which the notification is displayed with slightly different messaging such as, for example, the notification 647 of FIG. 6, if the notification is issued on a "surge day" for that category. The term "surge day" may be used herein to refer to a day on which demand for certain items or categories of items are experiencing higher than normal rental or demand.

FIG. 7 is an example mobile device screen 700 that may be displayed by a mobile application on a user device to enable a user to respond to a rental request by listing an item for rental, in accordance with various aspects of the present disclosure. A user that receives a notification of a rental request (e.g., "Borrow Request" 542 of FIG. 5), may decide to make an offer to lend an item that they own, and may click a "Make Offer" button associated with the "Borrow Request" (e.g., "Make Offer" button 543 of FIG. 5), which results in the display of the mobile device screen 700 of FIG. 7. To make an offer, the user wishing to rent their item then enters details of the item they wish to lend/rent into the various fields of the example mobile device screen 700 of FIG. 7. For example, the user wishing to lend/rent an item in response to a rental request may use the image capture (e.g., camera) capability of their mobile device to include one or more images 711 of the item being offered for rental. The responding user may also select a category of the item 712, and a brief description of the item 713. A more detailed description 714 may be entered, along with information identifying the name and Zip code of the location of the user making the offer. The offering user may also provide a fee for the rental 716 and the time period of the rental 717. The offering user may then submit the offer to a system of the present disclosure using the "Submit Offer" button 751. A message communicating the details of the offer to lend/rent the requested item may then be communicated to the user that issued the rental request, using the form of communication indicated by the user that issued the rental request. The elements of the mobile device screen 700 and the process of submitting the details of an offer to lend/rent an item may be the same as/similar to that employed when a user chooses to submit items for which the user has not actually received a rental request.

FIG. 8 is an example mobile device screen 800 used to display notifications and other communication to the user that is related to peer-to-peer rental activity, in accordance with various aspects of the present disclosure. The mobile device screen 800 may be displayed by a mobile application on a user device upon selection of the "Activity" tab 610, 810 of FIG. 6 and FIG. 8, respectively. As shown in the example of FIG. 8, the mobile device screen 800 includes an indication in the message area 835 of the number of new notifications received by the user of the mobile application, and indicators 844, 845 showing the number of conversations and notifications involving the user. The content portion 840 of the mobile device screen 800 shows the messages of the inter-user communication and the notifications received by the user of the mobile application. Included in the example of FIG. 8 is a notification 848 resulting from a response to a rental request.

Figure 9:
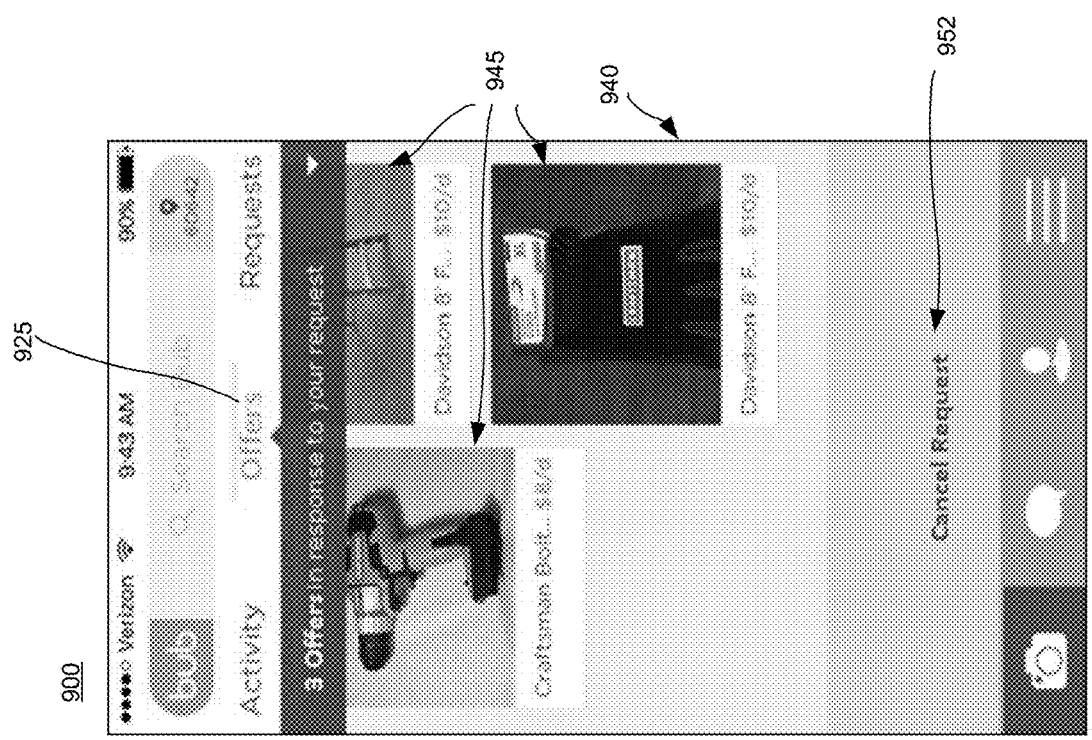
FIG. 9 is an example mobile device screen that may be displayed by a mobile application on a user device upon selection of the "Offers" tabs of FIG. 5 or FIG. 9, in accordance with various aspects of the present disclosure.

FIG. 9 is an example mobile device screen 900 that may be displayed by a mobile application on a user device upon selection of the "Offers" tabs 525, 925 of FIG. 5 or FIG. 9, in accordance with various aspects of the present disclosure. Using the mobile device screen 900, the original requester can view responses to their request at any time. The mobile device screen 900 of FIG. 9 includes a content portion 940 in which are displayed a number of offers 945 of other users to rent/lend an item requested by the requesting user (i.e., "borrower") of the mobile application. The requesting user may click-on/select any of the displayed offers 945 to see the details of the selected offer, and make a reservation of the offered item, in a manner similar to/the same as when browsing listing of items for rent/to borrow, as shown in the example illustrated and described above with respect to FIG. 3. In accordance with various aspects of the present disclosure, the original requester may choose to cancel/remove their rental request at any time before a transaction is initiated by simply clicking-on/selecting the "Cancel Request" button 952.

Various aspects of the present disclosure may be seen in a method of operating an online system supporting crowdsourced peer to peer rental of products items among a plurality of users. Such a method may comprise forming a collection of information identifying a plurality of product items submitted for rental by a respective user of the plurality of users, the collection of information comprising personal information identifying a geographic location of the submitting user; and receiving, from a communication device of a first user of the plurality of users, a request to rent a particular product item and a geographical location of the first user. The method may also comprise searching the collection of information to identify product items matching the particular product item and for which the geographic location of the submitting user is within a distance threshold of the geographic location of the first user; determining a number of product items in the collection that match the particular product item; and accepting, from the communication device of the first user, a request to communicate with potential lenders of the particular product item. Such a method may further comprise selecting one or more users of the plurality of users as potential lenders of the particular product item, according to one or both of a likelihood that the one or more users have the particular product item and a likelihood of the one or more users accepting a request to rent the particular product item; and sending a message to each of the potential lenders of the particular product item, the message comprising a notification of the request by the first user to rent the particular product item. Finally, the method may comprise receiving an acceptance of the request to rent the particular product item from a respective potential lender of the particular product item.

In accordance with various aspects of the present disclosure, the likelihood that the one or more users have the particular product item may be determined from purchase history information of the one or more users. The likelihood of the one or more users accepting a request to lend the particular product item may be determined from a number of responses of the one or more users to notifications of requests to lend related product items. The likelihood that the one or more users have the particular product item may be determined from purchase history information of the one or more users showing purchase of a product item related to use of the particular product item. The distance threshold may be adjusted based on the number of product items in the collection that match the particular product item. The method may further comprise sending to the first user a recommendation of a product item to rent, based upon a relationship of an intended used of the recommended product item to rent to product items in a purchase history of the first user. The method may further comprise computing a score indicating a propensity of the first user to rent a particular product item, according to the personal information of the first user. The method may also comprise sending information identifying a certain number of the product items that match the particular product item to the communication device of the first user for display, if it is determined that at least one product item in the collection matches the particular product item.

Additional aspects of the present disclosure may be found in an online system supporting crowdsourced peer to peer rental of products items among a plurality of users. Such a system may comprise at least one processor communicatively coupled to a display device, where the at least one processor, during operation, may perform at least the steps of the method described above.

Further aspects of the present disclosure may be seen in a non-transitory computer-readable medium having a plurality of code sections, where each code section comprises a plurality of instructions executable by one or more processors to perform actions supporting crowdsourced peer to peer rental of products items among a plurality of users. The actions of the one or more processors may comprise the steps of the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A computer-implemented method of operating an online system, the method comprising:
   receiving, from a mobile device, a request to rent a particular product item;
   determining, via a rental propensity model, a number of lenders to contact to evoke at least a certain minimum number of responses to a notification of a rental request, wherein the number of lenders is an average of a min depth and a max depth, and wherein the min depth and the max depth are generated according to a ranking of users to respond to a previous notification;
   sending, via a communication interface, a message to each of the number of lenders of the particular product item, the message comprising a notification of the request by a borrower to rent the particular product item; and
   receiving an acceptance of the request to rent the particular product item from a lender of the number of lenders of the particular product item.

2. The method according to claim 1, wherein the method comprises:
   forming a collection of information, stored in a database, identifying a plurality of product items submitted for rental by a plurality of lenders, the collection of information comprising a photograph of each of the plurality of product items and a geographic location of each lender in possession of each of the plurality of product items.

3. The method according to claim 1, wherein the method comprises:
   receiving, from a mobile device, a geographical location of the borrower.

4. The method according to claim 3, wherein the method comprises:
   searching a database to identify one or more product items matching the particular product item within a distance threshold of the borrower, wherein the distance threshold is predetermined by the borrower; and
   if the particular product item is not found within the distance threshold predetermined by the borrower, increasing the distance threshold until the particular product item is found or the distance threshold exceeds a maximum distance threshold.

5. The method according to claim 4, wherein the distance threshold relates to a distance that one or both of the respective user and the first user are willing to travel to one or both pick up and return the particular item.

6. The method according to claim 4, wherein the distance threshold is adjusted based on the number of product items in the collection that match the particular product item.

7. The method according to claim 1, wherein the request to rent the particular product item is based on a project identified by the borrower, and wherein an association between the project and the particular product is found in a purchase history of one or more of the plurality of lenders.

8. The method according to claim 1, wherein the plurality of lenders are able to use the online system to resell product items.

9. The method according to claim 1, wherein the method comprises:
sending a count of how many of the particular product item are available for rental or purchase.

10. A non-transitory computer-readable medium having a plurality of code sections, each code section comprising a plurality of instructions executable by one or more processors to perform actions supporting rental of products items among a plurality of users, wherein the actions of the one or more processors comprise:
receiving, from a mobile device, a request to rent a particular product item;
determining, via a rental propensity model, a number of lenders to contact to evoke at least a certain minimum number of responses to a notification of a rental request, wherein the number of lenders is an average of a min depth and a max depth, and wherein the min depth and the max depth are generated according to a ranking of users to respond to a previous notification;
sending, via a communication interface, a message to each of the number of lenders of the particular product item, the message comprising a notification of the request by a borrower to rent the particular product item; and
receiving an acceptance of the request to rent the particular product item from a lender of the number of lenders of the particular product item.

11. The non-transitory computer-readable medium according to claim 10, wherein the actions comprise:
forming a collection of information, stored in a database, identifying a plurality of product items submitted for rental by a plurality of lenders, the collection of information comprising a photograph of each of the plurality of product items and a geographic location of each lender in possession of each of the plurality of product items.

12. The non-transitory computer-readable medium according to claim 10, wherein the actions comprise:
receiving, from a mobile device, a geographical location of the borrower.

13. The non-transitory computer-readable medium according to claim 12, wherein the actions comprise:
searching a database to identify one or more product items matching the particular product item within a distance threshold of the borrower, wherein the distance threshold is predetermined by the borrower; and
if the particular product item is not found within the distance threshold predetermined by the borrower, increasing the distance threshold until the particular product item is found or the distance threshold exceeds a maximum distance threshold.

14. The non-transitory computer-readable medium according to claim 13, wherein the distance threshold relates to a distance that one or both of the respective user and the first user are willing to travel to one or both pick up and return the particular item.

15. The non-transitory computer-readable medium according to claim 13, wherein the distance threshold is adjusted based on the number of product items in the collection that match the particular product item.

16. The non-transitory computer-readable medium according to claim 10, wherein the request to rent the particular product item is based on a project identified by the borrower, and wherein an association between the project and the particular product is found in a purchase history of one or more of the plurality of lenders.

17. The non-transitory computer-readable medium according to claim 10, wherein the actions enable to the particular product item to be resold.

18. The non-transitory computer-readable medium according to claim 10, wherein the actions comprise:
sending a count of how many of the particular product item are available for rental or purchase.

19. An online system, the system comprising:
a memory device with computer-readable program code stored thereon, and
at least one processor communicatively coupled to a display device, the at least one processor being operable to:
receive, from a mobile device, a request to rent a particular product item;
determine, via a rental propensity model, a number of lenders to contact to evoke at least a certain minimum number of responses to a notification of a rental request, wherein the number of lenders is an average of a min depth and a max depth, and wherein the min depth and the max depth are generated according to a ranking of users to respond to a previous notification;
send, via a communication interface, a message to each of the number of lenders of the particular product item, the message comprising a notification of the request by a borrower to rent the particular product item; and
receive an acceptance of the request to rent the particular product item from a lender of the number of lenders of the particular product item.

20. The system according to claim 19, wherein the at least one processor is operable to:
form a collection of information, stored in a database, identifying a plurality of product items submitted for rental by a plurality of lenders, the collection of information comprising a photograph of each of the plurality of product items and a geographic location of each lender in possession of each of the plurality of product items.

21. The system according to claim 19, wherein the at least one processor is operable to:
receive, from a mobile device, a geographical location of the borrower.

22. The system according to claim 21, wherein the at least one processor is operable to:
search a database to identify one or more product items matching the particular product item within a distance threshold of the borrower, wherein the distance threshold is predetermined by the borrower; and
if the particular product item is not found within the distance threshold predetermined by the borrower, increase the distance threshold until the particular product item is found or the distance threshold exceeds a maximum distance threshold.

23. The system according to claim 22, wherein the distance threshold relates to a distance that one or both of the respective user and the first user are willing to travel to one or both pick up and return the particular item.

24. The system according to claim 22, wherein the distance threshold is adjusted based on the number of product items in the collection that match the particular product item.

25. The system according to claim 19, wherein the request to rent the particular product item is based on a project identified by the borrower, and wherein an association between the project and the particular product is found in a purchase history of one or more of the plurality of lenders.

26. The system according to claim 19, wherein the plurality of lenders are able to use the online system to resell product items.

27. The system according to claim 19, wherein the at least one processor is operable to:
send a count of how many of the particular product item are available for rental or purchase.

\* \* \* \* \*